(12) United States Patent
McKeeth

(10) Patent No.: US 9,910,974 B2
(45) Date of Patent: *Mar. 6, 2018

(54) METHOD FOR CONTROLLING USER ACCESS TO AN ELECTRONIC DEVICE

(71) Applicant: Micron Technology, Inc., Boise, ID (US)

(72) Inventor: James McKeeth, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,607

(22) Filed: Jan. 27, 2017

(65) Prior Publication Data

US 2017/0140142 A1    May 18, 2017

Related U.S. Application Data

(63) Continuation of application No. 15/265,406, filed on Sep. 14, 2016, which is a continuation of application No. 14/458,635, filed on Aug. 13, 2014, now Pat. No. 9,465,929, which is a continuation of application No. 13/735,553, filed on Jan. 7, 2013, now Pat. No. 8,839,416, which is a continuation of application No. 13/443,119, filed on Apr. 10, 2012, now Pat. No.
(Continued)

(51) Int. Cl.
*G06F 21/00* (2013.01)
*G06F 21/32* (2013.01)
*G06F 21/36* (2013.01)
*G06F 3/041* (2006.01)

(52) U.S. Cl.
CPC .............. *G06F 21/32* (2013.01); *G06F 3/041* (2013.01); *G06F 21/36* (2013.01)

(58) Field of Classification Search
None
See application file for complete search history.

(56) References Cited

U.S. PATENT DOCUMENTS 4,556,904 A    12/1985   Monat
4,655,368 A     4/1987   Bateman et al.
(Continued)

FOREIGN PATENT DOCUMENTS

JP    60 171560 A    9/1985
JP    60 142835 A    6/1986
JP    10 222241      8/1998

OTHER PUBLICATIONS

Drawing Passwords, IBM Technical Disclosure Bulletin, vol. 40, No. 5, May 1997.
(Continued)

*Primary Examiner* — Brandon Hoffman
(74) *Attorney, Agent, or Firm* — Knobbe, Martens, Olson & Bear, LLP

(57) ABSTRACT

A method and system for authenticating a user to access a computer system. The method comprises communicating security information to the computer system, and providing the computer system with an implicit input. The method further comprises determining whether the security information and implicit input match corresponding information associated with the user. The method further comprises granting the user access to the computer system in the event of a satisfactory match. When authenticating the user, the method and system consider the possibility of the user being legitimate but subject to duress or force by a computer hacker.

20 Claims, 4 Drawing Sheets

Related U.S. Application Data 8,352,745, which is a continuation of application No. 13/012,253, filed on Jan. 24, 2011, now Pat. No. 8,176,547, which is a continuation of application No. 10/926,727, filed on Aug. 26, 2004, now Pat. No. 7,877,612, which is a continuation of application No. 10/877,782, filed on Jun. 25, 2004, now abandoned, which is a continuation of application No. 09/511,092, filed on Feb. 23, 2000, now Pat. No. 6,766,456.

(56) References Cited

U.S. PATENT DOCUMENTS

| | | |
|---|---|---|
| 4,727,368 A | 2/1988 | Larson et al. |
| 4,759,063 A | 7/1988 | Chaum |
| 4,964,156 A | 10/1990 | Blair |
| 5,194,969 A | 3/1993 | DiFrancesco |
| 5,229,764 A | 7/1993 | Matchett et al. |
| 5,354,974 A | 10/1994 | Eisenberg |
| 5,465,084 A | 11/1995 | Cottrell |
| 5,546,071 A | 8/1996 | Zdunich |
| 5,559,961 A | 9/1996 | Blonder |
| 5,602,536 A | 2/1997 | Henderson et al. |
| 5,608,387 A | 3/1997 | Davies |
| 5,721,780 A | 2/1998 | Ensor et al. |
| 5,731,575 A | 3/1998 | Zingher et al. |
| 5,745,555 A | 4/1998 | Mark |
| 5,768,387 A | 6/1998 | Akiyama et al. |
| 5,821,933 A | 10/1998 | Keller et al. |
| 5,838,306 A | 11/1998 | O'Connor et al. |
| 5,930,804 A | 7/1999 | Yu et al. |
| 5,995,847 A | 11/1999 | Gergen |
| 6,006,328 A | 12/1999 | Drake |
| 6,021,212 A | 2/2000 | Ho |
| 6,023,688 A | 2/2000 | Ramachandran et al. |
| 6,035,406 A | 3/2000 | Moussa et al. |
| 6,055,438 A | 4/2000 | Winner, Jr. |
| 6,068,184 A | 5/2000 | Barnett |
| 6,091,835 A | 7/2000 | Smithies et al. |
| 6,122,042 A | 9/2000 | Wunderman et al. |
| 6,148,093 A | 11/2000 | McConnell et al. |
| 6,182,076 B1 | 1/2001 | Yu et al. |
| 6,192,478 B1 | 2/2001 | Elledge |
| 6,209,092 B1 | 3/2001 | Linnartz |
| 6,246,769 B1 | 6/2001 | Kohut |
| 6,256,737 B1 | 7/2001 | Bianco et al. |
| 6,298,447 B1 | 10/2001 | Wang |
| 6,303,924 B1 | 10/2001 | Adan et al. |
| 6,307,956 B1 | 10/2001 | Black |
| 6,321,339 B1 | 11/2001 | French et al. |
| 6,332,212 B1 | 12/2001 | Organ et al. |
| 6,363,485 B1 | 3/2002 | Adams et al. |
| 6,393,139 B1 | 5/2002 | Lin et al. |
| 6,418,424 B1 | 7/2002 | Hoffberg et al. |
| 6,420,971 B1 | 7/2002 | Leck et al. |
| 6,442,691 B1 | 8/2002 | Blandford |
| 6,452,492 B1 | 9/2002 | Drury |
| 6,510,523 B1 | 1/2003 | Perlman et al. |
| 6,587,547 B1 | 7/2003 | Zirngibl et al. |
| 6,591,242 B1 | 7/2003 | Karp et al. |
| 6,633,905 B1 | 10/2003 | Anderson et al. |
| 6,662,166 B2 | 12/2003 | Pare et al. |
| 6,687,390 B2 | 2/2004 | Avni et al. |
| 6,732,278 B2 | 5/2004 | Baird et al. |
| 6,766,456 B1 | 7/2004 | McKeeth |
| 6,834,341 B1 | 12/2004 | Bahl et al. |
| 6,853,739 B2 | 2/2005 | Kyle |
| 6,879,710 B1 | 4/2005 | Hinoue et al. |
| 6,895,514 B1 | 5/2005 | Kermani |
| 6,898,299 B1 | 5/2005 | Brooks |
| 6,927,758 B1 | 8/2005 | Piot et al. |
| 6,961,560 B2 | 11/2005 | Hermann et al. |
| 7,003,670 B2 | 2/2006 | Heaven et al. |
| 7,035,427 B2 | 4/2006 | Rhoads |
| 7,039,809 B1 | 5/2006 | Wankmueller |
| 7,234,156 B2 | 6/2007 | French et al. |
| 7,715,600 B2 | 5/2010 | Avni et al. |
| 7,877,612 B2 | 1/2011 | McKeeth |
| 8,176,547 B2 | 5/2012 | McKeeth |
| 8,352,745 B2 | 1/2013 | McKeeth |
| 8,839,416 B2 | 9/2014 | McKeeth |
| 9,465,929 B2 | 10/2016 | McKeeth |
| 2001/0000045 A1 | 3/2001 | Yu et al. |
| 2001/0036299 A1 | 11/2001 | Senior |
| 2002/0112183 A1 | 8/2002 | Baird et al. |
| 2003/0038824 A1 | 2/2003 | Ryder |
| 2004/0230807 A1 | 11/2004 | Baird et al. |
| 2005/0021960 A1 | 1/2005 | McKeeth |
| 2005/0022005 A1 | 1/2005 | McKeeth |
| 2005/0044382 A1 | 2/2005 | McKeeth |
| 2007/0198850 A1 | 8/2007 | Martin et al. |
| 2011/0119759 A1 | 5/2011 | McKeeth |
| 2012/0198544 A1 | 8/2012 | McKeeth |
| 2013/0185790 A1 | 7/2013 | McKeeth |
| 2014/0351928 A1 | 11/2014 | McKeeth |

OTHER PUBLICATIONS

Knowledge Adventure, Inc. User's Guide, pp. 1-18, 1996, "Jump Start Toddlers".

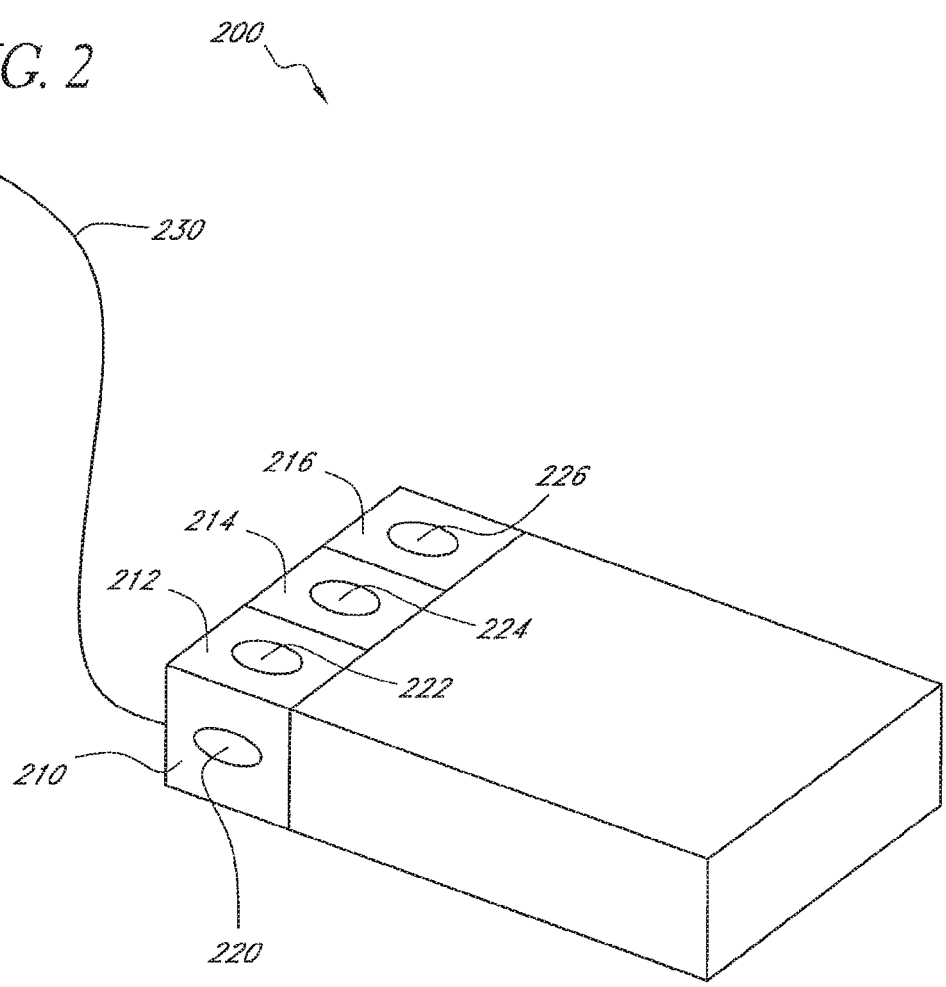

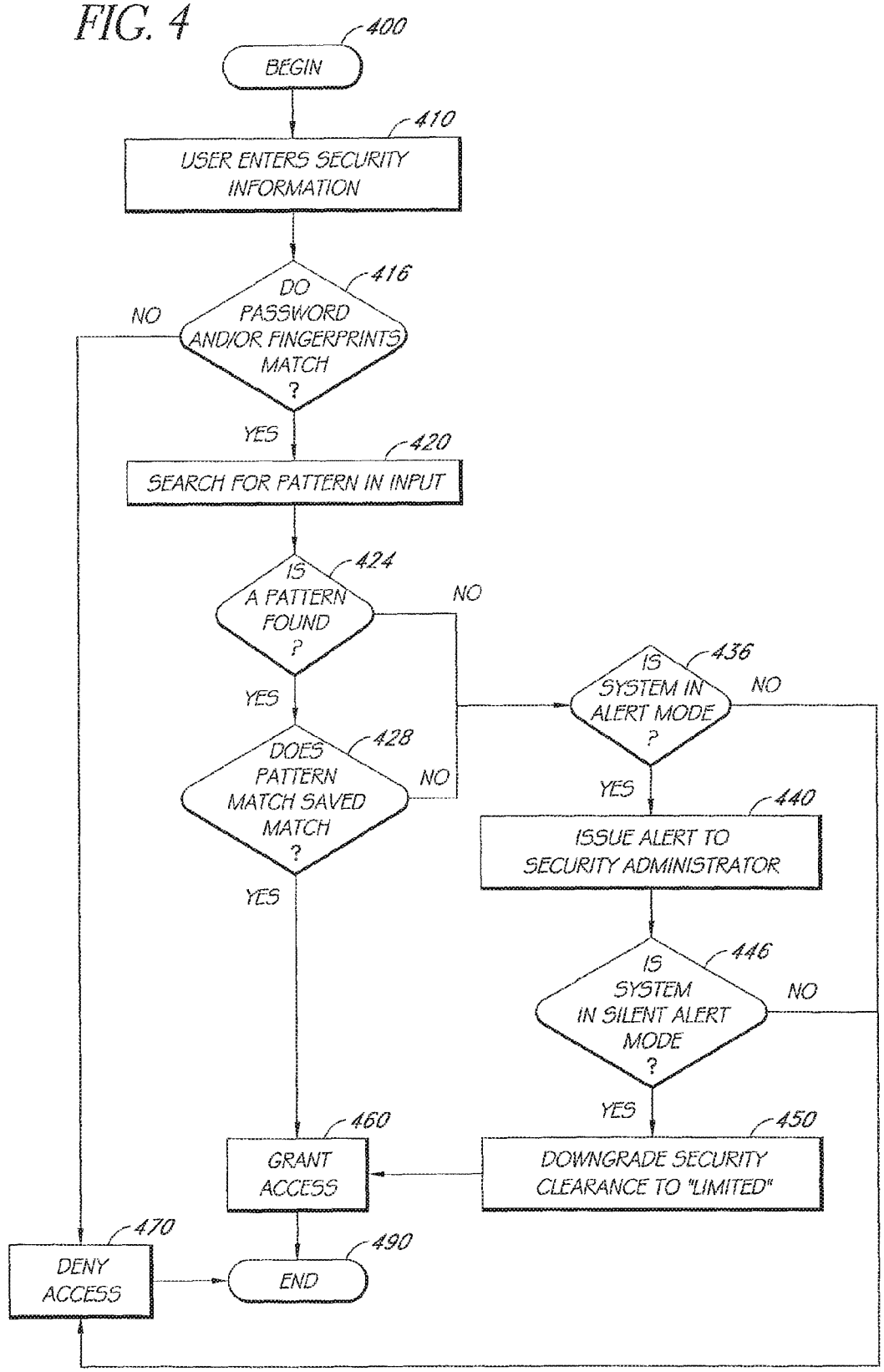

METHOD FOR CONTROLLING USER ACCESS TO AN ELECTRONIC DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates generally to methods of accessing a secure computer system. More particularly, this invention relates to a method and system for authenticating an identity of a user before accessing a computer system.

Description of the Related Art

In today's information age, a user is generally required to execute or pass some form of a security step, such as entering a private identification code or password, to access a computer system. As the computer stored information or application becomes more sensitive or valuable, greater security measures are desired to verify the identity and legitimacy of the user before allowing access to the computer system that contains such information or application. The use of a password alone, however, has become less reliable to authenticate the user. The reduced reliability of using a password alone has been due to a computer hacker's ability to locate, copy, or electronically identify or track the required password using specialized software programs. In some cases, computer hackers are simply able to obtain the user's password by exercising duress or force. Accordingly, the use of a password alone to authenticate the user for access to the computer system has not been very reliable.

Instead of or in combination with entering a password, some computer systems are designed to authenticate the user by requiring the user to turn a conventional key or swipe a machine readable card. These techniques, however, are still subject to the same weaknesses as those identified for using a password. Recently, some computer makers considered using the user's fingerprint to authenticate and grant access to the computer system. In such a system, a peripheral device, such as a mouse, includes a fingerprint acquisition module that provides to the computer a signal representative of the fingerprint of the user. The computer compares the user's fingerprint signal to a list of signals stored in its memory. If the user's fingerprint signal matches a signal that is stored in the computer memory, the user is granted access to the computer system, otherwise access is denied. For further details about such computer system, reference is made to U.S. Pat. No. 5,838,306 issued to O'Connor et al. on Nov. 17, 1998, which is incorporated in its entirety by reference. Using a fingerprint is still not immune to the computer hacker's ability to force the user to place his/her finger on the acquisition device. Moreover, a sophisticated computer hacker may be able to copy the user's fingerprint and provide a simulated signal to the computer system to obtain access.

Therefore, the above-described authentication techniques do not overcome a computer hacker's ability to access the computer by forcing the user to enter a password, turn a key, swipe a card, or place the user's finger on a fingerprint acquisition device. There is a need in the computer technology to provide an implicit authentication technique that is immune to force or theft by computer hackers.

SUMMARY OF THE INVENTION

To overcome the above-mentioned limitations, the invention provides a method and system for authenticating a user to access a computer system. The method comprises communicating security information to the computer system, and providing the computer system with an implicit input. The method further comprises determining whether the security information and implicit input match corresponding information associated with the user. The method further comprises granting the user access to the computer system in the event of a satisfactory match.

The system comprises a user interface configured to communicate security information and an implicit input to the computer. The system further comprises a compare circuit that is operationally coupled to the user interface. The compare circuit is configured to determine whether the security information and implicit input match corresponding information associated with the user. The system further comprises a process circuit that is operationally coupled to the compare circuit. The process circuit is configured to grant the user access to the computer in the event of a satisfactory match. In another embodiment, the system comprises means for interfacing the user with the computer. The interfacing means is configured to communicate security information and an implicit input to the computer. The system further comprises means, operationally coupled to the interfacing means, for comparing the security information and implicit input with corresponding information associated with the user. The system further comprises means, operationally coupled to the comparing means, for processing the compared information and granting the user access to the computer in the event of a satisfactory match.

BRIEF DESCRIPTION OF THE DRAWINGS

The above and other aspects, features, and advantages of the invention will be better understood by referring to the following detailed description, which should be read in conjunction with the accompanying drawings, in which:

FIG. 2 is a perspective view of a peripheral device that may be used with the invention.

FIG. 4 is a flowchart describing one embodiment of the method of authenticating a user in accordance with the invention.

DETAILED DESCRIPTION OF THE PREFERRED EMBODIMENT

The following description is not to be taken in a limiting sense, but is made merely for the purpose of describing the general principles of the invention. The scope of the invention should be determined with reference to the claims.

Figure 1:
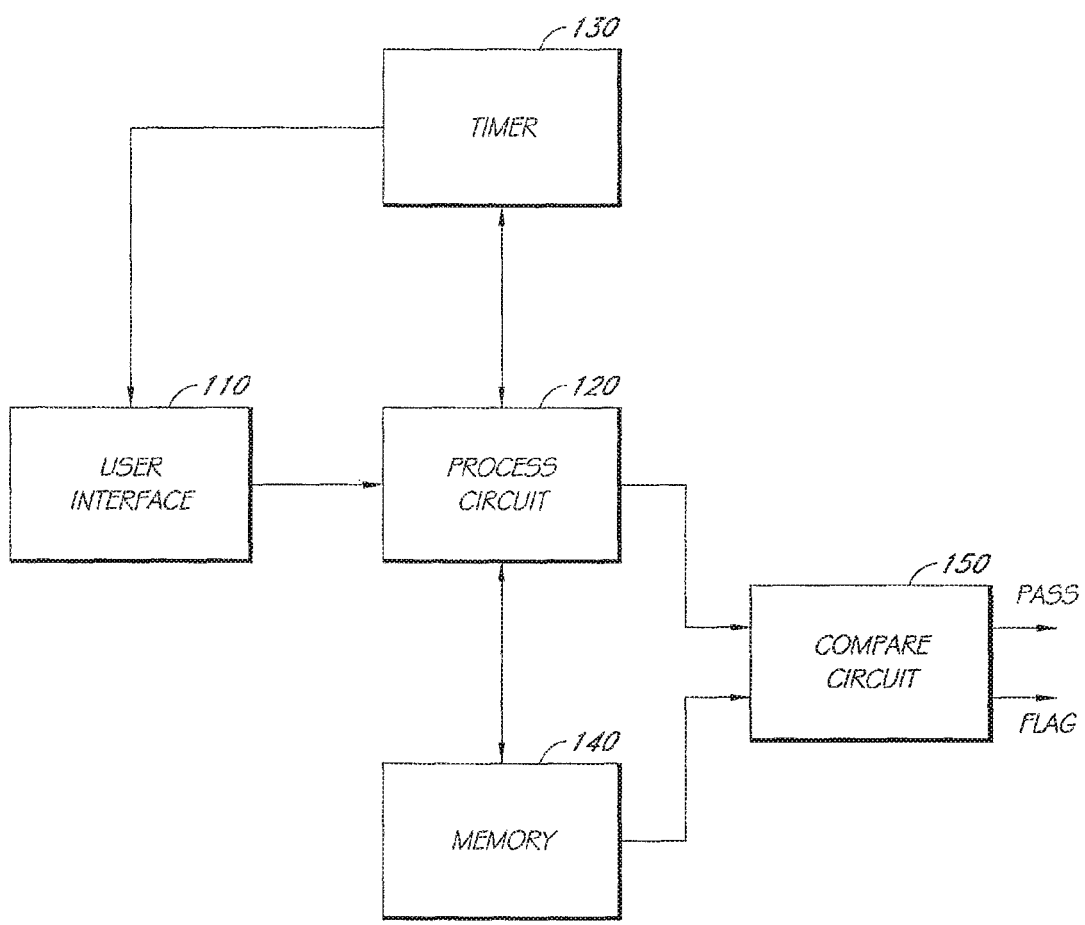
FIG. 1 is a block diagram showing one embodiment of a computer system in accordance with the invention.

FIG. 1 is a block diagram showing one embodiment of a computer system 100 in accordance with the invention. As shown in FIG. 1, the computer system 100 comprises a user interface 110 that is operationally connected to a process circuit 120. The user interface 110 may be any input device that is used to enter or communicate information to the computer system 100, such as a keyboard, mouse, trackball, pointer, touch-screen, remote terminal, audio sensor, optical scanner, telephone, or any similar user interface. The user interface may provide input signals to the computer system 100 in an analog form, which typically requires conversion to digital form by the computer system 100, or in a digital form. For example, when using a keyboard, a computer user (not shown in this figure) may enter a password representing a unique series of keys. When using a mouse or trackball, the user may enter a unique series of clicks using left, center, and/or right buttons of the mouse. Alternatively, the user may enter a unique geometric pattern (see FIGS. 3A-3D) concurrently with or shortly after entering the password. When using an audio sensor, such as a microphone, the user may enter audio information, such the user's voice, which may be uniquely identified by the computer system 100. When using an optical scanner, the user may scan his/her fingerprint or other physical feature such as the retina into the computer system 100 for authentication.

Any, a combination, or all of the above-described types of input signals may be used to authenticate a user. For example, the computer system 100 may be designed to receive a combination of input signals in a form of a password from a keyboard, in a form of a fingerprint scan from an optical scanner (e.g., placed on the keyboard or mouse), and in a form of a geometric pattern from a mouse or trackball. The user may input these signals substantially concurrently, or in any agreed upon sequence. For example, the user may enter a password through the keyboard and, within a predetermined duration of time (e.g., 5 seconds), place his/her finger on the mouse to be scanned while moving the mouse in a specified pattern, e.g., clockwise circle. As further described below, before granting the user's request for access, the computer system 100 may be configured to recognize the combination of a password, fingerprint, and a particular pattern that is unique to each user.

The process circuit 120 is configured to receive input signals from the user interface 110 for processing. If the input signals are in analog form, the process circuit 120 converts the input signals to digital form for further processing. If desired or necessary, the process circuit 120 filters undesired components of the input signals, so that only components that are necessary for identification are passed on. The process circuit is operationally connected with a timer 130 that measures time duration between the various input signals. As noted above, the computer system 100 may be configured to recognize and accept for processing input signals (e.g., password) that occur within a predetermined duration of time from other input signals (e.g., fingerprint scan or pattern). Accordingly, the process circuit 120 may instruct the timer 130 to measure time between input signals to determine whether the user is an authorized user. For example, the duration between entering a password and performing a fingerprint scan and/or pattern may be set to a maximum of 10 seconds. If, after entering a legitimate password, the user takes too long (i.e., greater than 10 seconds) to perform a fingerprint scan and/or pattern, the process circuit 120 may deny access to the computer system 100, as described for the method of FIG. 4.

If, on the other hand, the user performs a fingerprint scan and/or pattern within the designated time, the process circuit 120 communicates the input signals to a compare circuit 150 for authentication. The compare circuit 150 is operationally coupled to a memory 140, which stores a list of legitimate user identifications (ID's) with respective passwords, fingerprint, pattern, or any other type of information ("security information") for recognition by the computer system 100. The process circuit 120 may instruct the memory 140 to communicate security information to the compare circuit 150 for authentication. The compare circuit 150 also receives and compares input information from the process circuit 120 with the security information received from the memory 140. If there is a match between the input and security information, the compare circuit 150 issues a "pass" signal to the computer system 100 (e.g., a host processor) indicating acceptance of and authorizing access by the user. If the input and security information do not match, the compare circuit issues a "flag" signal indicating denial of access by the user.

In one embodiment, the user is always required to perform an implicit, invisible, or non-apparent act (the "implicit" act or input). The implicit input may include an active and/or a passive act. For instance, in performing the active act, the user may generate a geometric pattern (e.g., using a mouse) when requesting access to the computer system 100. The computer system 100 may be configured to recognize a particular geometric pattern under the condition that the user performs such pattern concurrently with, or after a predetermined duration from, scanning his/her fingerprint. In performing the passive act, the user may wait a predetermined time intervals between entry of various components of the security information or, for instance, may skip a predetermined letter of each component of the security information. In heightened security applications, it may be desirable to configure the computer system 100 to issue a security alert to the responsible authority (e.g., security guards or law enforcement personnel) if the user fails to perform the geometric pattern. Accordingly, even if the compare circuit 150 determines that the input (e.g., fingerprint) and security information do match, the compare circuit 150 may still issue the flag signal because of the user's failure to perform the geometric pattern.

In such a scenario, the computer system 150 recognizes that while the user may be legitimate, the user's failure to perform the geometric pattern may be an indication that the user is experiencing duress or force to access the computer system 100, as described for the method of FIG. 4. In some applications, it may be desirable to grant a limited access to the user to give the false impression that access to the computer system 100 is granted as usual. As used herein, "limited access" is any access that provides a user or intruder access that is less than complete access to the computer system 100. However, concurrently with the limited access, a silent security alert may be issued to security personnel, without allowing the user or intruder to know. Using the silent security alert mode silent alert minimizes risk to the user under duress.

Any of the structural components of the computer system 100, e.g., the process circuit 120 and compare circuit 150, may be implemented using commonly known hardware, such as one or more digital circuits, to perform the authentication functions of the computer system 100. Alternatively, the functions of such structural components may be implemented using a dedicated signal processor, such as a digital signal processor (DSP) that is programmed with instructions to perform the authentication functions of the computer system 100.

FIG. 2 is a perspective view of a peripheral device 200 that may be used with the invention. The peripheral device 200 may comprise a mouse that communicates signals with the computer system 100 (see FIG. 1) via a cable 230, or via a wireless link (not shown in this figure) such as a radio frequency (RF) or infrared (IR) link. In one embodiment, the user interface 110 (see FIG. 1) may comprise the peripheral device 200 through which a user may send user security information (e.g., a user ID, password, fingerprint scan, and a specified pattern) to the computer system 100 to obtain access thereto.

As shown in FIG. 2, the peripheral device 200 comprises one or more buttons 210, 212, 214, and 216, which, when pressed by the user, send various signals that are recognized by the computer system 100. As described above, in addition to a password and fingerprint scan, the computer system 100 may be configured to require the user to enter a pattern comprising a unique sequence of button pressings to authenticate the user. Accordingly, concurrently with or shortly after the fingerprint scan, the user may press one or more of the buttons 210-216 to generate a unique sequence of signals before the computer system 100 may grant access. For example, the sequence of signals may be generated by pressing the button sequence 214, 212, 216, and 212. In response to the user security information, the computer system 100 determines if the user may be granted access as described above.

The peripheral device 200 may optionally comprise a trackball (not shown in this figure) that allows the user to manipulate the position of a pointer on a visual display, such as a display monitor, in response and proportionally to the motion of the trackball on a surface, such as a pad. The characteristics and operation of such a trackball are well known in the art. The peripheral device 200 may also comprise one or more optical scanner windows 220, 222, 224, and 226. If the authentication process requires a fingerprint scan, one or more of the scanner windows 220-226 may scan the fingerprint of the user and form an electronic image of the fingerprint. The peripheral device 200 sends the electronic image to the computer system 100 for authenticating the user as described above. The characteristics and operation of the optical scanner windows 220-226 are well known in the art.

Figure 3A:
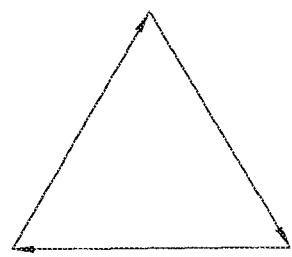
FIGS. 3A, 3B, 3C, and 3D illustrate exemplary patterns that are recognized by the computer system of FIG. 1.

As noted above, in addition to entering a password and fingerprint scan, the computer system 100 may be configured to require the user to enter a unique geometric pattern via the peripheral device 200 to authenticate the user. Accordingly, concurrently with or shortly after the fingerprint scan, the user may move the peripheral device 200 on a flat surface in a predetermined geometric pattern to generate the unique geometric pattern, as outlined by the trackball of the peripheral device 200. FIGS. 3A, 3B, 3C, and 3D illustrate exemplary patterns that are recognized by the computer system 100. As shown in FIG. 3A, the user may move the peripheral device 200 to generate a triangle 310 in a specified direction on the flat surface. The peripheral device 200 sends the generated pattern in a form of electrical signals to the computer system 100 for authentication. As described above, if the computer system 100 determines that the generated pattern matches a pattern stored in the memory 140 (see FIG. 1), the computer system 100 grants the access. If, on the other hand, the computer system 100 determines that the generated pattern does not match a stored pattern, the computer system 100 may deny access or, if configured to do so, lock up the computer system 100 and generate a security alert to the responsible authorities.

Figure 3B:
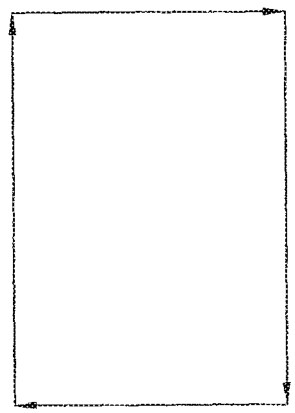
Figure 3C:
Figure 3D:
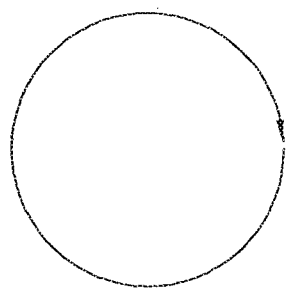

FIG. 3B shows another exemplary pattern in a form of a rectangle 320 that may be generated by the user via the peripheral device 200. FIG. 3C shows another exemplary pattern in a form of a straight line 330 that may be generated by the user via the peripheral device 200. Finally, FIG. 3D shows still another exemplary pattern in a form of a circle 340 that may be generated by the user in a clockwise direction via the peripheral device 200.

FIG. 4 is a flowchart describing one embodiment of the method of authenticating a user in accordance with the invention. The method of the invention commences at block 400 when the computer system 100 (FIG. 1) is first powered up. At block 410, the user enters the user's security information such as a user identification, password, and/or fingerprint scan, pursuant to system access instructions. At a decision block 416, the computer system 100 determines whether the entered security information matches corresponding information in the memory 140. If the security information does not match, the method proceeds to block 470 where the computer system 100 denies access to the user. If, on the other hand, the security information matches corresponding information in the memory 140, the method proceeds to block 420.

In this embodiment, the computer system 100 is configured to recognize the implicit input that the user enters concurrently with, or within a predetermined duration of, entering the security information. As noted above, the implicit input may be a geometric pattern that the user generates via the user interface 110. Accordingly, at block 420, the computer system 100 waits and searches for a predetermined pattern signal from the user interface 110. The pattern signal may be in analog or digital form that represents the pattern that the user generates, e.g., the circle 340. At a decision block 424, the computer system 100 determines if a pattern signal is received from the user interface 110 within the predetermined duration. If a pattern signal is not received or found, the method proceeds to block 436. If, on the other hand, a pattern signal is received from the user interface 110, the method proceeds to a decision block 428, where the computer system 100 determines whether the pattern signal matches a corresponding pattern signal stored in memory 140. If the entered pattern signal matches the stored pattern signal, the method proceeds to block 460 where the computer system 100 grants the user's request for access. If, on the other hand, the entered signal pattern does not match the stored pattern signal, the method proceeds to the decision block 436.

As indicated above, the computer system 100 may be configured to operate in an alert mode if desired by the system administrator. The alert mode represents a mode of operation wherein the computer system 100 responds to an access request using an authentication process that is more stringent than when operating in a non-alert ("normal") mode. For instance, upon receiving instructions to heighten security measures (e.g., in response to an overt threat or intelligence information), the system administrator may configure the computer system 100 to operate in the alert mode. Alternatively, the system administrator may configure the computer system 100 to operate in the alert mode based on any desired criteria, such as geographic location of the computer system 100, content or sensitivity of stored information, and/or other factors. In the alert mode, the computer system 100 alerts security personnel if it is determined that there is a possibility of a security breach. Accordingly, at block 436, the computer system 100 determines if the alert mode is activated. If the alert mode is not activated, the method proceeds to block 470, where the computer system 100 denies the user's request to access the computer system 100. If, on the other hand, the alert mode is activated, the method proceeds to block 440. Thus, in the event of an absent or incorrect pattern signal, the computer system 100 avoids issuing unwarranted security alerts when operating in the normal mode. However, if it is operating in the alert mode, the computer system 100 applies a stringent authentication process and issues security alerts in the event of an absent or incorrect pattern signal.

As noted above, the computer system 100 may represent at least a portion of a computer network that is accessible via multiple user terminals, including security and supervisory personnel terminals. Accordingly, if the alert mode is activated, then at block 440 the computer system 100 is configured to issue an alert signal to a predetermined destination, e.g., a security terminal that is accessible by security personnel. The alert signal may be a text message indicating that a potential security breach or unauthorized attempt to access the network has occurred at a particular location, e.g., electronic or physical address of the computer system 100. At block 446, the computer system 100 determines whether the silent alert mode is activated. As noted above, the silent alert mode allows a limited access to a user that is potentially under the influence of duress or force. Hence, the system administrator may selectively activate or deactivate the silent alert mode based on any desired criteria, such as the level of safety necessary for users at a particular location.

Accordingly, if the silent alert mode is not activated, the method proceeds to block 470 where the computer system 100 denies the user access to the computer system 100. If, on the other hand, the silent alert mode is activated, the method proceeds to block 450 where the computer system 100 downgrades or limits the scope of access for the user who entered the security information. As noted above, limited access is any access that provides a user or intruder access that is less than complete access to the computer system 100. For example, the limited access may allow the user to read or view only a particular list of files that do not contain sensitive information. The limited access may also include preventing the user from printing or copying any files that are stored in the computer system 100. After downgrading the scope of access for the user, the method proceeds to block 460 where the computer system 100 provides the user with limited access to the computer system 100. As noted above, while the computer system 100 grants the user with the limited access, the computer system issues the alert signal to security personnel without notifying the user or intruder that any such signal was issued. The method terminates at block 490 after either granting the user's request at block 460 or denying the user's request at block 470 to access the computer system 100.

In view of the foregoing, it will be appreciated that the invention overcomes the long-standing need for a method and system for correctly authenticating a user despite the presence of duress and force by a computer hacker. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to be embraced within their scope.

What is claimed is:

1. A method comprising:
    granting, with an access system of an apparatus comprising memory storing at least one file and a processing circuit, limited access to the at least one file when the processing circuit detects a geometric pattern performed by a user in a specified direction on a touch screen of the apparatus; and
    granting, with the access system, additional access to the at least one file when the processing circuit determines one or more of a physical feature sensed by a sensing device of the apparatus matches a known physical feature, and a password entered by the user on the touch screen matches a known password.

2. The method of claim 1 wherein the physical feature is a fingerprint, a retina, or a voice.

3. The method of claim 1 further comprising, when the access system receives touch screen input data determined from the user's touch and representing the user-performed geometric pattern, using the touch screen input data to detect the user-performed geometric pattern.

4. The method of claim 1 further comprising, when the access system receives data representative of the sensed physical feature, using the data representative of the sensed physical feature to determine if the sensed physical feature matches the known physical feature.

5. The method of claim 1 further comprising, when the access system receives data representative of the user-entered password, using the data representative of the user-entered password to determine if the user-entered password matches the known password.

6. The method of claim 1 wherein the geometric pattern is a line.

7. The method of claim 1 further comprising receiving data representative of the user-performed geometric pattern as a first user-interactive step after the apparatus is deactivated and reactivated.

8. The method of claim 1 further comprising receiving data representative of the sensed physical feature as a first user-interactive step after the apparatus is deactivated and reactivated.

9. The method of claim 1 further comprising receiving data representative of user-entered password as a first user-interactive step after the apparatus is deactivated and reactivated.

10. The method of claim 1 wherein the limited access is read-only access.

11. A method comprising:
    granting, with a user access system comprising memory storing at least a first file and a second file and a processing circuit, limited access to the first file without granting access to the second file in response to a user performing, on a touch screen of the apparatus, a geometric pattern in a predetermined direction that is detected by the user access system; and
    granting, with the user access system, additional access to the first file and access to the second file in response to at least one matching event, the at least one matching event selected from the group consisting of a match, determined by the user access system, between an acquired fingerprint acquired from a fingerprint acquisition device of the apparatus and a known fingerprint, and a match, determined by the user access system, between a password entered by the user on the touch screen and a known password.

12. The method of claim 11 wherein the memory further stores one or more of data representative of the known fingerprint and data representative of the known password.

13. The method of claim 11 further comprising:
    receiving touch screen input data determined from the user's touch and representing the user-performed geometric pattern; and
    using the touch screen input data to detect the user-performed geometric pattern.

14. The method of claim 11 further comprising:
    receiving data representative of the acquired fingerprint; and using the data representative of the acquired fingerprint to determine if the acquired fingerprint matches the known fingerprint.

15. The method of claim 11 further comprising:

receiving data representative of the user-entered password; and using the data representative of the user-entered password to determine if the user-entered password matches the known password.

16. The method of claim 11 wherein the geometric pattern is a line, a circle, or a rectangle.

17. The method of claim 11 further comprising receiving data representative of the user-performed geometric pattern as a first user-interactive step after the apparatus is deactivated and reactivated.

18. The method of claim 11 further comprising receiving data representative of the acquired fingerprint as a first user-interactive step after the apparatus is deactivated and reactivated.

19. The method of claim 11 further comprising receiving data representative of the user-entered password as a first user-interactive step after the apparatus is deactivated and reactivated.

20. The method of claim 11 wherein the limited access is read-only access.

* * * * *